(No Model.)
T. W. MANN.
SHADING HOOD FOR PHOTOGRAPHIC CAMERAS.
No. 387,092. Patented July 31, 1888.
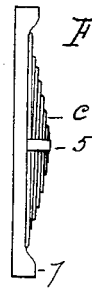
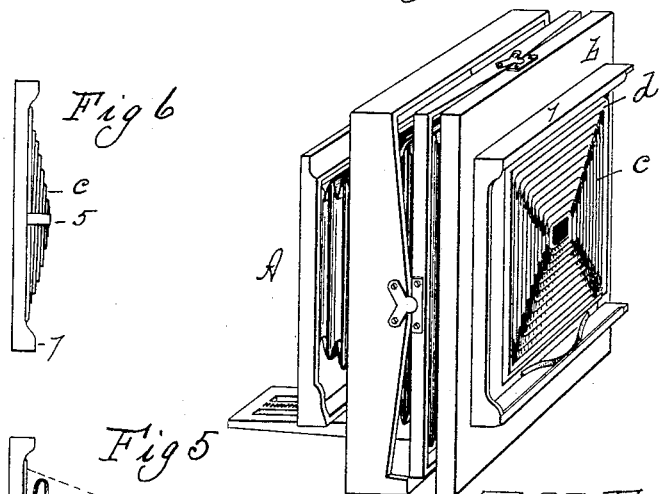
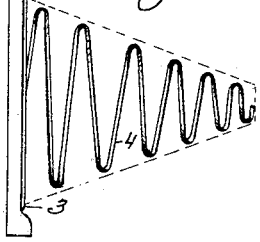
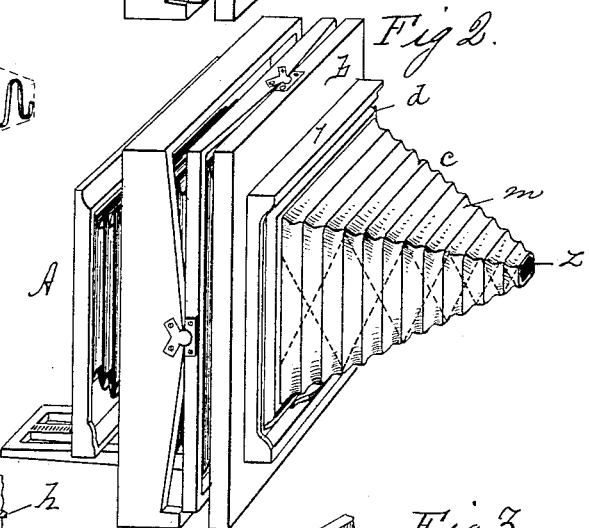
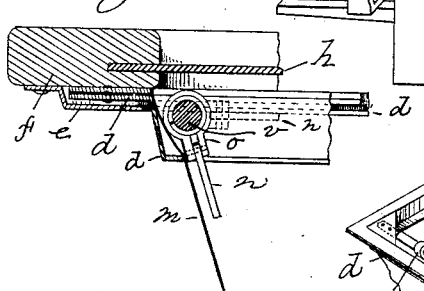
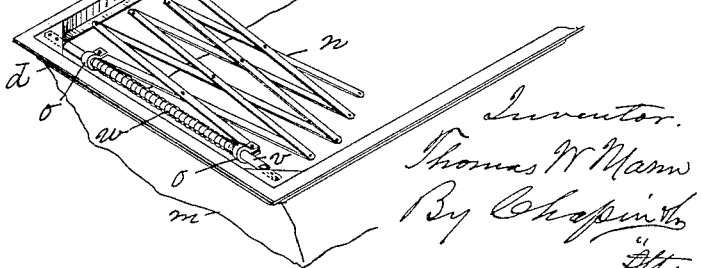
Witnesses
G. M. Chamberlain.
Wm H Chapin
Inventor.
Thomas W Mann
By Chapin &c
Atty

UNITED STATES PATENT OFFICE.

THOMAS W. MANN, OF HOLYOKE, MASSACHUSETTS.

SHADING-HOOD FOR PHOTOGRAPHIC CAMERAS.

SPECIFICATION forming part of Letters Patent No. 387,092, dated July 31, 1888.

Application filed November 19, 1886. Serial No. 219,337. (No model.)

*To all whom it may concern:*

Be it known that I, THOMAS W. MANN, a citizen of the United States, residing at Holyoke, in the county of Hampden and State of Massachusetts, have invented new and useful Improvements in Shading-Hoods for Photographic Cameras, of which the following is a specification.

This invention relates to photographic cameras, and pertains to an improved shade-hood therefor, the object being to supersede the use of the ordinary black cloth which is used by photographers for covering their heads and the camera to obstruct the light when focusing an object on the ground glass; and the invention consists in the construction and arrangement of said improved shade-hood, all as hereinafter fully described, and set forth in the claims.

In the drawings forming part of this specification, Figures 1 and 2 are perspective views of a photographic camera having applied thereto a shade-hood embodying my invention, Fig. 1 showing said shade-hood folded flatly against the camera, and Fig. 2 showing said hood distended, or in the position in which it is used for focal observation, on the rear side of the camera. Figs. 3 and 4 illustrate detail parts, hereinafter fully described. Fig. 5 illustrates a modified construction of means for holding the shade-hood in a distended position. Fig. 6 illustrates the folded position of the shade-hood when said modified construction is embodied therein.

In the drawings, A indicates a photographic camera of ordinary construction, and $b$ the rear side of said camera, on which is secured the ground-glass frame $f$ (see Fig. 4) within the projecting border 7. A metallic strip, $e$, is secured near the upper and lower edge of said ground-glass frame $f$, the edge of which stands outwardly away from the side of said frame far enough to form a narrow groove between the strip and the frame for the reception of the edges of a metallic frame, $d$, a portion of which is shown in Fig. 3 and in Fig. 4, said frame being preferably of rectangular form and having a strip of metal, as shown in Fig. 4, secured against one side thereof around its borders, between which and the frame one end of the hood cloth or body is secured, $m$ indicating said cloth.

The shade-hood $c$ consists of the aforesaid cloth or body $m$, which is constructed of a dark flexible textile material, preferably thin rubber cloth, and is made, as shown, of a pyramidal or conic form, the apex of which is provided with an opening, $z$, through which the operator looks at the ground glass $h$ of the camera. As aforesaid, the base or larger end of the cloth $m$ of the hood is secured to the frame $d$, and to the latter is attached a suitable metallic frame-work capable of being distended and collapsed, on which frame-work or thereto the cloth-body $m$ of the hood $c$ is attached. The preferable frame-work construction to be applied inside of the hood $c$, to allow of its extension to any required extent, and whereby it is best supported in a horizontal position, as shown in Fig. 2, consists of two lazy-tongs, $n$, a portion of one of which is shown in Fig. 3. Two of said lazy-tongs are attached to the frame $d$ at opposite edges thereof, the manner of said attachment being shown in Fig. 3, wherein $v$ is a metallic bar extending across and secured by its ends to said frame. A spiral spring, $w$, is placed on the bar $v$, and also two collars, $o$, are placed loosely thereon, having each a lip, to which the ends of the cross-bars at the base of the lazy-tongs are pivoted. Said collars permit the lazy-tongs to swing on the bar $v$ when the hood $c$ is distended and collapsed, for when the hood is in the latter position, or that shown in Fig. 1, the lazy-tongs fold flat in substantially the plane of the ground glass $h$ back of them; and when the hood $c$ is drawn out or distended, as in Fig. 2, the extremities follow the motion of the small or open end of the hood, thereby giving to the collars $o$, to which the base of the lazy-tongs is connected, a slight rolling motion on the rod $v$. The spring $w$ on said rod between said collars serves to hold the latter and the ends of the lazy-tongs attached thereto, with a somewhat yielding action, a certain distance apart, thereby insuring the proper unfolding action of the lazy-tongs when drawn by their extremities, as they are when the hood is pulled out or distended, as aforesaid, the position of the lazy-tongs in the last-named position of the hood being shown in dotted lines in Fig. 2.

When the hood $c$ is distended, as in Fig. 2, the lazy-tongs constitute, as it were, two truss-frames within the opposite inner sides of the shade-hood c, which support the latter in the position shown in said Fig. 2, either fully or partly distended, as may be most convenient for the operator when watching the figure on the ground glass to properly focus the instrument.

In Fig. 4 a portion, n, of the lazy-tongs indicates the position of the latter relative to the glass h when the shade-hood is distended, and the dotted lines indicated by the same letter in that figure show the position of the lazy-tongs when the shade-hood is folded flat against the rear side of the camera, as shown in Fig. 1, and the base portion of one of the lazy-tongs in Fig. 3 illustrates the position thereof when the hood is folded against the camera.

It will be seen by the above description that to construct a shade-hood possessing the aforesaid conveniences its usefulness to a great extent depends upon the arrangement in its interior of some means for holding it in the position shown in Fig. 2, whereby it perfectly cuts off the light from the ground glass h of the camera and is permitted to be folded against the back side of the camera for convenience of transportation with the latter.

In Fig. 5 is shown a modification of the means for supporting said hood (the outline of the latter being shown in said figure in dotted lines) in a distended position, which consists of a continuous spiral spring having a tapering form, to which said hood may be attached, the base of said spring being attached to any suitable frame, 3, similar to said frame d. Since the spiral spring 4 will not remain in a collapsed position when pressed with the hood against the rear side of the camera, a strap, 5, Fig. 6, may be secured outside of the hood c, when said spring is used, to hold the hood in the position shown in said last-named figure. The hood, when made with said spiral spring, as described, is secured within the projecting border 7 on the rear side of the camera, in the same manner as is the hood shown in Fig. 1.

The above-described shade-hood supersedes entirely the use of the usual black shading-cloth in common use by photographers, which is thrown over the head and the rear part of the camera when the operator wishes to shut the light from the ground glass of the instrument, so that he can observe the focal development of the figure which is thrown thereon by the lens.

The use with a camera of the within-described improved shade-hood affords many advantages practically over said shading-cloth, in that in operating the instrument it obviates the necessity of caring for a part therefor which is not attached to the instrument, and since the shade c is attached to the latter it is held steadily in proper position to shade the ground glass when operating out of doors in boisterous weather, and it leaves both hands of the operator free to focally adjust the instrument while he is watching the figure upon the ground glass.

What I claim as my invention is—

1. A shade-hood for photograph-cameras, consisting of the flexible body m, attached by one end to the camera and having an opening in its free end, combined with the lazy-tong frames n, attached by one end to the camera and to said hood, substantially as set forth.

2. The combination, in a camera, of the frame d, having the cross-bar v, the collars o, and the spring w on said bar, the lazy-tongs n, having one end pivoted to said collars, and the flexible hood m, having its base attached to said frame and inclosing said lazy-tongs, substantially as set forth.

3. A shading-hood for photographic cameras made in pyramidal form of flexible material and having an opening through its apex opposite the ground glass of the camera, and having an internal frame support which is collapsible together with said hood, whereby the said open end of the latter is permitted to be moved toward and from said glass, and the hood, when distended, is supported in substantially a horizontal position, or one at right angles to the side of said glass, substantially as set forth.

THOMAS W. MANN.

Witnesses:
H. A. CHAPIN,
H. F. ASHTON.